United States Patent Office 3,482,102
Patented Dec. 2, 1969

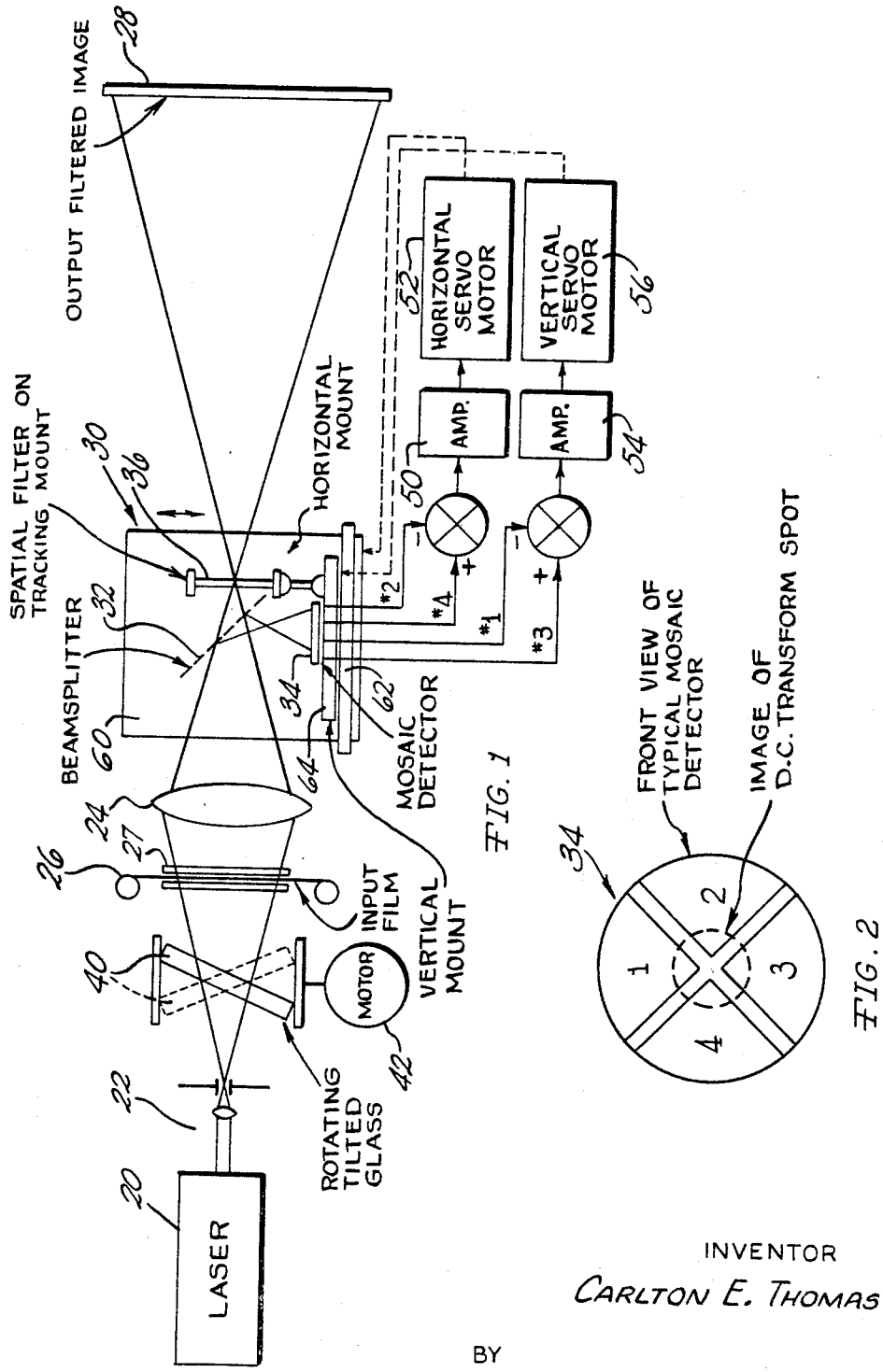
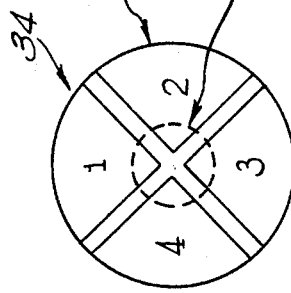

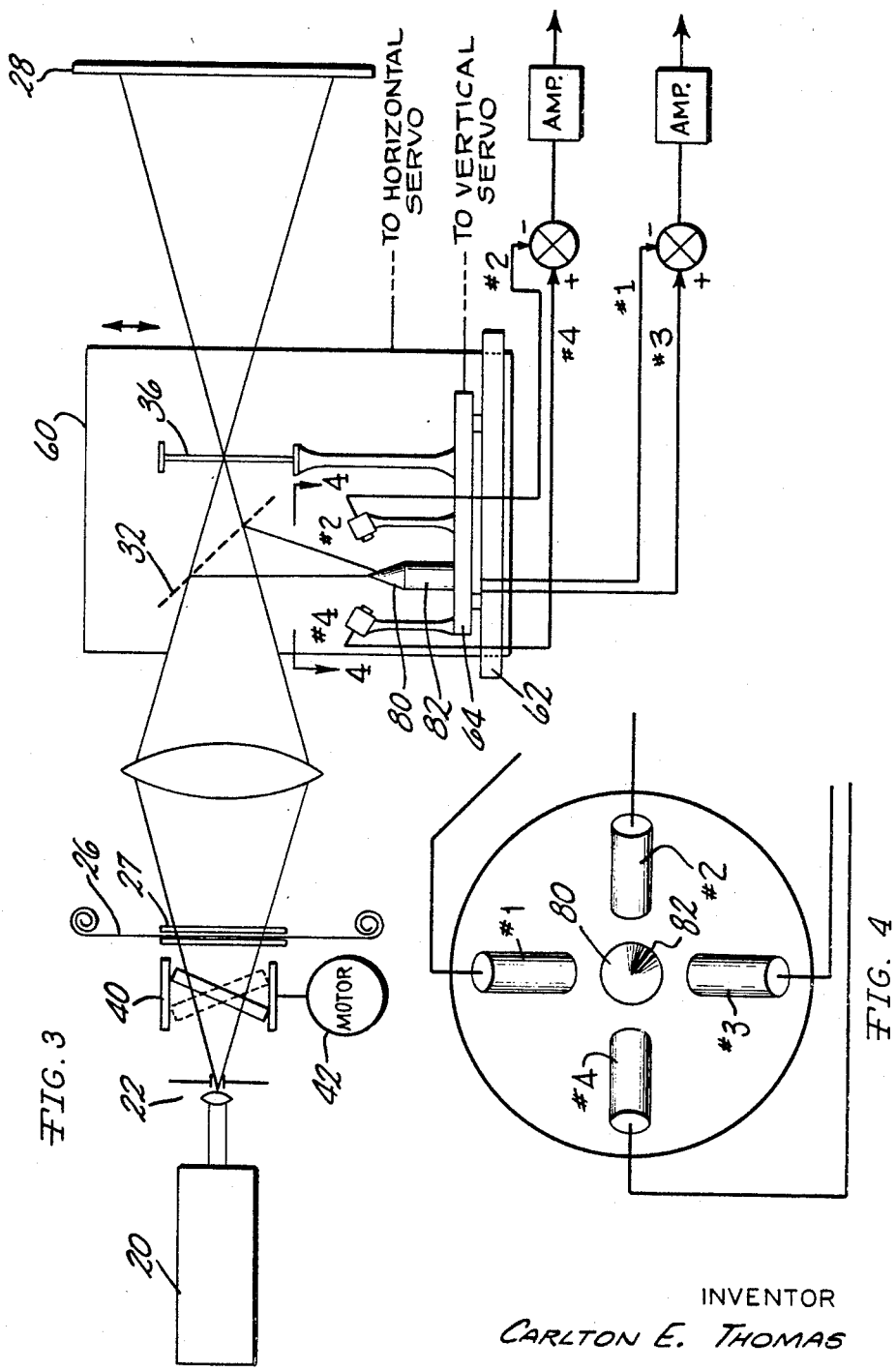

3,482,102
COHERENT OPTICAL NOISE SUPPRESSION BY OPTICAL ALIGNMENT OF SPATIAL FILTER
Carlton E. Thomas, Ann Arbor, Mich., assignor to Conductron Corporation, Ann Arbor, Mich., a corporation of Delaware
Filed Feb. 20, 1967, Ser. No. 617,170
Int. Cl. G01j 1/20
U.S. Cl. 250—201        10 Claims

ABSTRACT OF THE DISCLOSURE

This invention relates to the suppression of optical noise in optical systems, particularly those utilizing coherent light sources such as lasers, by placing in the optical axis a tilted transparency plate which is moved about the optical axis to average out the noise diffraction rings, and further relates to a system for moving a spatial filter in the system to maintain center on a transform plane.

---

The use of coherent light sources such as lasers or arc sources combined with "pinholes" has improved the use of many optical data processing techniques. Optical correlation, data processing, and spatial filtering, as well as matched filter correlation has been and is being accomplished in optical systems utilizing a coherent light source. For example, a two-dimensional photographic negative can be placed in a coherent optical system which creates a two-dimensional Fourier transform or frequency analysis of the negative.

By placing appropriate attenuating filters in the Fourier transform plane, the quality of the photographs can often be improved by altering the frequency spectrum. This is analogous to electronic filtering to remove distortion in telephone lines, phonograph recordings, etc. These techniques are described in detail in an article entitled "Spatial Filtering in Optics" by Edward L. O'Neill in IRE Transactions on Information Theory, June 1956.

One drawback, however, in the use of these systems is that the coherent light source which makes practical the spatial filtering adds considerable "noise" to the optical system. Each dust particle, bubble or defect in any lens or glass element generates a set of diffraction rings. With white light, this is not a problem since the photographic film effectively averages over all visible wave lengths and over many angles of arrival. With a coherent light source an image can be much sharper but extraneous diffraction rings appear due to out-of-focus perturbations, surface defects and dust particles.

One suggested solution has been to rotate the lens to average out the noise, but this reduces only the noise generated by the lens imperfections and leaves that which is due to noise on the film gates or filters, etc. The lens rotation requires also extremely low mechanical tolerances to maintain the output image stationary and a separate motor and bearing system is required for each lens.

The present invention contemplates a method and apparatus to average out spatial noise while permitting spatial filtering and the sharpness of image which can be achieved with a coherent light source. The result is accomplished without a mechanical tolerance problem and all noise in the system except the noise on or immediately adjacent to the film input can be averaged out. In addition, only one rotating plane is required regardless of the complexity of the optical system.

Other objects and features of the invention will be apparent in the following description and claims in which the principle of operation is described together with the best mode contemplated for carrying out the invention.

Drawings accompany the disclosure and the various views thereof may be briefly described as:
FIG. 1, a schematic view of an optical system in which the invention is illustrated.
FIG. 2, a front view of a mosaic detector utilized in the spatial filter control.
FIG. 3, a schematic view of an optical system utilizing a modified filter servo signal device.
FIG. 4, a view on line 4—4 of FIG. 3 showing servo signal heads.

It should be first pointed out that a coherent system can generally produce a sharper image, in for example, a film enlargement. This may be due in part to the flat bandpass over low spatial frequencies for coherent imaging systems as compared to the linear fall-off of the incoherent optical transfer function. In a real system the lenses are not ideal. In the coherent system rays pass through the lens nearly parallel to the optical axis and the only non-parallel rays are those diffracted by noise or by the signal film itself. Thus, a fifty-line per millimeter spatial frequency on the film diffracts light at $$\theta = \frac{\lambda}{T} = \frac{.6328\mu}{20\mu}$$

or $$\theta = .0316 \text{ radians}$$

or $$\theta = 1.8 \text{ degrees}$$

In a diffusely illuminated incoherent system, the rays pass through the lens at angles of ±10–20 degrees. Thus, at these wide angles the lens aberrations becomes very significant.

Also, the coherent light eliminates any residual chromatic aberration. Thus, coherent imaging systems inherently reduce the effects of several lens aberrations.

However, it is proposed in the present invention further to improve the coherent system by a system which will average out and thus practically eliminate lens aberrations and also to eliminate noise due to imperfection resulting from dust, film gates, filters and the like.

As shown in FIGURE 1, an optical system is composed of a laser 20 directed to a beam spreader and pinhole combination 22 and a lens 24. A signal or input plane in the form of a film 26 frequently used with a liquid film gate represented at 27 is interposed in the optical axis on which is also an output plane or film 28. The system shown is elemental although it could be a more complex correlator or matched filter correlator or seismic filtering system such as are known in present art.

A filter system is interposed at 30 wherein a beam splitter 32 directs a portion of the coherent beam down to a mosaic detector 34, the purpose of which will be later described.

The basic element in the optical system to reduce noise is a light transmitting plane such as a plate 40 of glass or an equivalent transparent or surface reflective substance mounted atilt the optical axis for rotation about the axis by a motor 42. This plate effectively changes the angle of arrival of the light beam striking the input negative, thus varying the angle of the rays as a function of time. Looking upstream toward the entrance pinhole, it would appear to rotate. Since the angle of the light rays passing through the system varies during one revolution, the noise diffraction rings vary and tend to average out. A resulting output photographic enlargement has the improved detail due to a coherent light source but is also free of significant noise patterns.

It will be appreciated that other types of motion about the axis are equally effective such as oscillatory or nutational.

Thus, all noise is averaged to some degree regardless of its source in the system and no mechanical tolerance is required since it comes before the imaging system. In addition, only one moving plate is required regardless of the complexity of the optical system.

In an optical system which utilizes a filter and a transform plane (frequency spectrum), there must be a compensatory motion since while the image of the system does not rotate the transform plane does nutate. The spatial filter must, therefore, move to remain centered on the transform at each instant of time. To accomplish this, a tracking system is provided to follow transform plane motion.

A mosaic detector plate 34 mounted on a moving platform carrying a spatial filter 36 has four segments 1, 2, 3, 4, spaced about a central point (FIGURE 2). This detector, through the beam splitter 32 senses the bright D.C. spot in the transform plane from the laser. This spot will always represent the center of the Fourier transform plane. As the plate 40 rotates, this spot of light moves in a circle. Thus, the error signal is derived by motion of the spot away from the center of the mosaic detector. If the spot is centered and it then moves to the left as viewed in FIGURE 2, then detector No. 4 will receive more light while detector No. 2 will receive less light. These two singals are subtracted electronically. The difference is normally zero with equal exposure but with the shift to the left the difference will go positive. This positive error signal is amplified at 50 and used to drive a horizontal servo motor 52 which in turn moves the filter mechanism 30 and filter 36 as well as the mosaic detector to a proper corresponding position to return the spot to the center. The error voltage is reduced to zero whenever the D.C. spot is again centered on the detector. This is a null seeking servo system, and, assuming proper choice of servo time constants, the tracker will always maintain the detector centered at the D.C. spot. Segments No. 1 and No. 3 operate through an amplifier 54 and a vertical servo motor 56.

In practice, a horizontal platform 60 is suitably mounted on a bearing slide for horizontal motion in the direction of the arrows, the motion to be controlled by servo-motor 52. On platform 60 is affixed a riser panel 62 (FIGURE 1) on which is mounted, for vertical motion, a slide 64, which carries beam-splitter 32, mosaic detector 34, and spatial filter mount 36. Vertical servo-motor 56, which is mounted to move with platform 60, controls the position of slide 64. The spatial filter is always physically oriented to coincide with the D.C. spot which passes through the beam splitter, whenever the mosaic detector is centered. The filter thus tracks the D.C. spot for any motion.

As a result, the rotating plate 40 could have a tilt angle variation with rotation and introduce a wider range of illumination angle variation. This would result in a spiral path of the D.C. spot (the center of the transform plane) but the mosaic tracker could follow any such motion.

In FIGURE 3, is shown a modified system for tracking the filter utilizing a conical mirror 80 which may be a polished conical end of a solid metal rod 82. Disposed in quadrature around and above the conical mirror are four light responsive detectors, No. 1, No. 2, No. 3, No. 4 (FIGURE 4), connected to amplifiers 50 and 54 as in FIGURE 1 to provide the servo function of moving platform 60 and vertical slide 64 in response to the motion of the D.C. spot to maintain the transform plane in proper relation to the optical axis of the signal beam. Other aspects of FIGURE 3 are similar to FIGURE 1.

The conical mirror 80 avoids any spaces between the quadrants of the light reflective surface and insures better accuracy in the tracking action.

What is claimed as new is as follows:

1. A method of automatically suppressing optical noise, in an optical system utilizing a source of coherent light and an element that responds to coherent light to develop an intelligible signal, which comprises using said source of coherent light to generate a beam of coherent light that is directed along an optical axis, establishing a transmitting plane in said system atilt said optical axis adjacent said source of coherent light and disposing said transmitting plane so it receives and passes said beam of coherent light, disposing said element beyond said transmitting plane so it receives coherent light that is received and passed by said transmitting plane and so it responds to said coherent light to develop said intelligible signal, and moving said transmitting plane about said optical axis of said system to change with time the angles of rays illuminating said element, said movement of said transmitting plane about said optical axis shifting said coherent light, that is passed by said transmitting plane, relative to said optical axis and relative to said element to automatically average out noise diffraction rings developed by said coherent light as said coherent light passes through said system to reach said element.

2. A method of automatically suppressing optical noise, in an optical system utilizing a source of coherent light and an element that responds to coherent light to develop an intelligible signal, which comprises using said source of coherent light to generate a beam of coherent light that is directed along an optical axis, establishing a light directing optical element in said optical axis so it receives and directs said beam of coherent light, said light directing optical element being mounted to cause coherent light to incline away from said optical axis, disposing said element so it receives coherent light and responds to said coherent light to develop said intelligible signal, and moving said light directing optical element relative to said optical axis to vary the angle of rays of said coherent light in said system as a function of time, said movement of said light directing optical element relative to said optical axis shifting said coherent light, that is received and directed by said light directing optical element, relative to said optical axis to automatically average out noise diffraction rings developed by said coherent light as said coherent light passes through said system.

3. An apparatus automatically suppressing optical noise in an optical system which comprises a source of coherent light, an element that responds to coherent light from said source of coherent light to develop an intelligible signal, said source of coherent light generating a beam of coherent light that is directed along an optical axis, light directing optical element in said system positioned atilt said optical axis of said system so it receives and directs said beam of coherent light, said light directing optical element being mounted to cause coherent light to incline away from said optical axis, said element being disposed so it receives coherent light and responds to said coherent light to develop said intelligible signal, and means for moving said light directing optical element about said optical axis of said system to change with time the angles of rays of said coherent light in said system, said movement of said light directing optical element about said optical axis shifting said coherent light, that is directed by said light directing optical element, relative to said optical axis to automatically average out noise diffraction rings developed by said coherent light as said coherent light passes through said system.

4. An apparatus for automatically suppressing optical noise in an optical system which comprises a source of coherent light, an element that responds to coherent light from said source of coherent light to develop an intelligible signal, said source of coherent light generating a beam of coherent light that is directed along an optical axis, a light directing optical element in said system positioned atilt said optical axis of said system so it receives and directs said beam of coherent light, said light directing optical element being mounted to cause coherent light to incline away from said optical axis, said element being disposed so it receives coherent light and responds to said coherent light to develop said intelligible signal, and means for moving said light directing optical element about said optical axis of said system to change with time the angles of rays of said coherent light in said system, said movement of said light directing optical element about said optical axis shifting said coherent light, that is directed by said light directing optical element, relative to said optical axis to automatically average out noise diffraction rings developed by said coherent light as said coherent light passes through said system, said light directing optical element being positioned between said source of coherent light and said element, said shifting of said coherent light that is directed by said light directing optical element causing said coherent light to shift relative to said element but said element responding to said shifting coherent light to develop said intelligible signal.

5. An apparatus for automatically suppressing optical noise which comprises a source of coherent light, an element that responds to coherent light from said source of coherent light to develop an intelligible signal, said source of coherent light generating a beam of coherent light that is directed along an optical axis, a light directing optical element in said system positioned atilt said optical axis of said system so it receives and directs said beam of coherent light, said light directing optical element being mounted to cause coherent light to incline away from said optical axis, said element being disposed so it receives coherent light and responds to said coherent light to develop said intelligible signal, and means for moving said light directing optical element about said optical axis of said system to change with time the angles of rays of said coherent light in said system, said movement of said light directing optical element about said optical axis shifting said coherent light, that is directed by said light directing optical element, relative to said optical axis to automatically average out noise diffraction rings developed by said coherent light as said coherent light passes through said system, said element developing an input image, a lens system for creating a spatial frequency transform plane of said input image, a spatial frequency filter, mounting means for mounting said spatial frequency filter at said frequency transform plane, and means responsive to motion of a portion of said frequency transform for moving said mounting means responsively to maintain said spatial frequency filter in proper relationship to said frequency transform during motion of said light directing optical element.

6. An apparatus for automatically suppressing optical noise in an optical system which comprises a source of coherent light, an element that responds to coherent light from said source of coherent light to develop an intelligible signal, said source of coherent light generating a beam of coherent light that is directed along an optical axis, a light directing optical element in said system positioned atilt said optical axis of said system so it receives and directs said beam of coherent light, said light directing optical element being mounted to cause coherent light to incline away from said optical axis, said element being disposed so it receives coherent light and responds to said coherent light to develop said intelligible signal, and means for moving said light directing optical element about said optical axis of said system to change with time the angles of rays of said coherent light in said system, said movement of said light directing optical element about said optical axis shifting said coherent light, that is directed by said light directing optical element, relative to said optical axis to automatically average out noise diffraction rings developed by said coherent light as said coherent light passes through said system, said means responsive to motion of said potrion of said frequency transform comprising a mosaic detector and a servo-mechanism responsive to light variation on said mosaic detector operably associated with said mounting means to move said mounting means in a following motion.

7. An apparatus for automatically suppressing optical noise in an optical system which comprises a source of coherent light, an element that responds to coherent light from said source of coherent light to develop an intelligible signal, said source of coherent light generating a beam of coherent light that is directed along an optical axis, a light directing optical element in said system positioned atilt said optical axis of said system so it receives and directs said beam of coherent light, said light directing optical element being mounted to cause coherent light to incline away from said optical axis, said element being disposed so it receives coherent light and responds to said coherent light to develop said intelligible signal, and means for moving said light directing optical element about said optical axis of said system to change with time the angles of rays of said coherent light in said system, said movement of said light directing optical element about said optical axis shifting said coherent light, that is directed by said light directing optical element, relative to said optical axis to automatically average out noise diffraction rings developed by said coherent light as said coherent light passes through said system, said means responsive to motion of said portion of said frequency transform comprising a detector mechanism responsive to the position of a predetermined frequency in said transform plane including a circular non-planar reflective surface, a plurality of light responsive detector means positioned to receive light in varying degrees selectively from said reflective surface, and a servo mechanism responsive to light variation in said detector means to move said mounting means responsively in a following motion.

8. An apparatus for automatically suppressing optical noise in an optical system which comprises a source of coherent light, an input signal data plane, an output section, an optical system between said input signal data plane and said output section including means to create a frequency transform of the input data at said input signal data plane, a light directing optical element in said optical system positioned to receive signal data from said input signal data plane and to direct said signal data to said output section and to change the angle of the rays of coherent light issuing from said source of coherent light, and means to move said light directing optical element to vary the rays of said source of coherent light as a function of time, the varying of said rays of said source of coherent light as said moving means moves said light directing optical element automatically averaging out noise diffraction rings developed by said coherent light as said coherent light passes through said optical system.

9. An apparatus for automatically suppressing optical noise in an optical system which comprises a source of coherent light, an input signal data plane, an output section, an optical system between said input signal data plane and said output section including means to create a frequency transform of the input data at said input signal data plane, a light directing optical element in said optical system positioned to receive signal data from said input signal data plane and to direct said signal data to said output section and to change the angle of the rays of coherent light issuing from said source of coherent light, and means to move said light directing optical element to vary the rays of said source of coherent light as a function of time, the varying of said rays of said source of coherent light as said moving means moves said light directing optical element automatically averaging out noise diffraction rings developed by said coherent light as said coherent light passes through said optical system, a filter interposed at said frequency transform of said system, means movably mounting said filter, and means to maintain said filter in a proper relative position to compensate for the varying rays which comprises: a beam splitter upstream from said transform, and light responsive means positioned to receive light rays from said beam splitter and operably associated with said means for mounting said filter to shift said filter and beam splitter in response to said varying ray angle to maintain said filter in a predetermined position relative to said transform.

10. An apparatus for automatically suppressing optical noise in an optical system which comprises a source of coherent light, an input signal data plane, an output section, an optical system between said input signal data plane and said output section including means to create a frequency transform of the input data at said input signal data plane, a light directing optical element in said optical system positioned to receive signal data from said input signal data plane and to direct said signal data to said output section and to change the angle of the rays of coherent light issuing from said source of coherent light, and means to move said light directing optical element to vary the rays of said source of coherent light as a function of time, the varying of said rays of said source of coherent light as said moving means moves said light directing optical element automatically averaging out noise diffraction rings developed by said coherent light as said coherent light passes through said optical system, said means for mounting said filter comprising a first platform movable reciprocably in a horizontal direction, and a second platform movable reciprocably in a vertical direction mounted reciprocably on said first platform, said second platform carrying said filter, said beam splitter and said light responsive means, and a pair of servo motors operably associated respectively with said platforms and responsive to said light responsive means.

References Cited

UNITED STATES PATENTS

| | | | |
|---|---|---|---|
| 2,870,671 | 1/1959 | Falconi | 250—236 X |
| 3,268,185 | 8/1966 | Eckerman | 250—203 X |

JAMES W. LAWRENCE, Primary Examiner

C. R. CAMPBELL, Assistant Examiner

U.S. Cl. X.R.

250—208, 209, 210, 236